United States Patent
Kasamatsu

(10) Patent No.: US 6,411,432 B1
(45) Date of Patent: Jun. 25, 2002

(54) LASER OSCILLATOR AND LASER AMPLIFIER

(75) Inventor: Tadashi Kasamatsu, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/527,421

(22) Filed: Mar. 17, 2000

(30) Foreign Application Priority Data

Mar. 19, 1999 (JP) .......................................... 11-075704
Jun. 3, 1999 (JP) .......................................... 11-156745

(51) Int. Cl.$^7$ .............................................. H01S 3/00
(52) U.S. Cl. .............................. 359/341.33; 359/337.1
(58) Field of Search .............................. 372/6; 359/341, 359/333, 342, 343, 341.33, 337.1

(56) References Cited

U.S. PATENT DOCUMENTS

| | | | |
|---|---|---|---|
| 4,938,556 A | * 7/1990 | Digonnet et al. | 350/96.15 |
| 4,967,416 A | * 10/1990 | Esterowtiz et al. | 372/6 |
| 5,042,039 A | * 8/1991 | Edagawa et al. | 372/6 |
| 5,084,880 A | * 1/1992 | Esterowtiz et al. | 372/6 |
| 5,247,529 A | * 9/1993 | Heidemann | 372/23 |
| 5,299,210 A | * 3/1994 | Snitzer et al. | 372/6 |
| 5,309,452 A | * 5/1994 | Ohishi et al. | 372/6 |
| 5,366,937 A | * 11/1994 | Schneider et al. | 501/40 |
| 5,388,110 A | * 2/1995 | Snitzer | 372/6 |
| 5,453,873 A | * 9/1995 | Millar et al. | 359/341 |
| 5,488,624 A | * 1/1996 | Thrash et al. | 372/41 |
| 5,727,007 A | * 3/1998 | Smart et al. | 372/6 |
| 6,205,164 B1 | * 3/2001 | Ohishi et al. | 372/70 |

FOREIGN PATENT DOCUMENTS

| | | | |
|---|---|---|---|
| JP | 3-289186 | 12/1991 | ............ H01S/3/094 |
| JP | 6-120598 | 4/1994 | ............ H01S/3/094 |
| JP | 8-95097 | 4/1996 | ............ G02F/1/35 |
| JP | 8-250790 | 9/1996 | ............ H01S/3/094 |
| JP | 9-120090 | 5/1997 | ............ G02F/1/35 |
| JP | 2688303 | 8/1997 | ............ H01S/3/17 |
| JP | 10-56224 | 2/1998 | ............ H01S/3/10 |
| JP | 10-163554 | 6/1998 | ............ H01S/3/10 |
| JP | 10-229238 | 8/1998 | ............ H01S/3/10 |
| JP | 11-501770 | 2/1999 | ............ H01S/3/06 |

OTHER PUBLICATIONS

Ono et al., "Gain–Flattened Er$^{3-}$–Doped Fiber Amplifier for a WIDM Signal in the 1.57–1.60–$\mu$m Wavelength Region," IEEE Photonics Technology Letters, vol. 9, No. 5, May, 1997, pp. 596–598. (See also discussion on p. 2 of the present specification.).

* cited by examiner

Primary Examiner—Thomas H. Tarcza
Assistant Examiner—Deandra M. Hughes
(74) Attorney, Agent, or Firm—Dickstein Shapiro Morin & Oshinsky LLP

(57) ABSTRACT

A laser amplifier and/or oscillator comprise a gain medium including rare earth dopant in an host medium. Ions of the rate earth dopant has an energy level structure including a ground level and a pair of laser upper level and laser lower levels between which a stimulated transition is to be produced after production of a population inversion between the pair of laser upper and laser lower levels. A first exciting light source is coupled to the gain medium for introducing first exciting light to said gain medium to produce said population inversion. A second exciting light source is coupled to the gain medium for introducing second exciting light to the gain medium to raise the rare earth dopant ions from the ground level to the laser lower level.

16 Claims, 10 Drawing Sheets

| | FIRST EXCITING LIGHT (1050nm) | SECOND EXCITING LIGHT (1560nm) |
|---|---|---|
| ① —○— | PUMP=110mW | 0mW (COMPARATIVE EXAMPLE) |
| ② —▲— | PUMP=110mW | 8mW |
| ③ —■— | PUMP=110mW | 12mW |
| ④ —▼— | PUMP=110mW | 20mW |
| ⑤ —●— | PUMP=110mW | 35.3mW |

LASER OSCILLATOR AND LASER AMPLIFIER

BACKGROUND OF THE INVENTION

1. Field of the Invention

The present invention relates to a laser oscillator and a laser amplifier, and particularly to a solid-state laser incorporating a gain medium including a rare earth dopant species, and more particularly to a fiber laser.

2. Description of the Related Art

Rare earth doped lasers are key devices in optical data transmission systems, in laser processing systems and in laser medical systems. Examples of rare earth dopant species are erbium (Er), holmium (Ho), thulium (Tm), and praseodymium (Pr). The rare earth doped lasers include glass lasers (for example, fiber lasers), solid laser oscillators, and laser amplifiers (for example, fiber amplifiers).

Erbium ions are excited by light from an exciting light source having a wavelength of 1.48 $\mu$m (microns) or light from an exciting light source having a wavelength of 0.98 $\mu$m (microns). When excited, they are raised to an upper laser energy level of $^4I_{13/2}$, from which stimulated transition to a lower energy level of $^4I_{15/2}$ is to be produced. Production of this stimulated transition causes an erbium doped optical fiber to exhibit gain spectra range from 1.53 $\mu$m to 1.57 $\mu$m with 1.55 $\mu$m as a central wavelength. Transition of erbium ions from $^4I_{13/2}$ to $^4I_{15/2}$ has fluorescent spectra range from 1.50 $\mu$m to 1.60 $\mu$m. This means that a satisfactory gain can be obtained at 1.60 $\mu$m band by optimally setting wavelength of exciting light and fiber parameters, such as, the strength and length of fiber and the density of erbium dopant.

Recently, attempts have been reported to make a shift of the peak of gain spectra toward a longer wavelength side with the fluorescent band (in the neighborhood of 1.60 $\mu$m). As an example of an attempt to achieve such a shift, Ono et al., "Gain-Flattened $Er^{3+}$-Doped Fiber Amplifier for a WIDM Signal in the 157–1.60$\mu$m Wavelength Region," IEEE Photonics Technology Letters, Vol. 9, No. 5 May 1997 pages 596–598 describe that 200 m is the optimum length of silica-based $Er^{3+}$-doped fiber for constructing an $Er^{3+}$-doped fiber amplifier (EDFA), which exhibits uniform amplification characteristic in the 1.57–1.60 $\mu$m wavelength region.

With regard to erbium, the above-mentioned shift of gain spectra, which is hereinafter referred to as "a gain shift", is hey technique in accomplishing amplification over a wide wavelength band. The gain shift technique is very important in next generation wavelength division multiplexing (WDM) data transmission systems.

With regard to any other stimulated transition of erbium than the transition from $^4I_{13/2}$ to $^4I_{15/2}$, there is no example of an attempt to make a gain shift. This is because the above-mentioned gain shift technique is applicable to the stimulated transition to the ground state level, only. Gain shift technique has not been developed with regard to stimulated transitions to energy levels other than the ground state level, which are regarded as important stimulated transitions for industrial applications. Examples of such important stimulated transitions are a stimulated transition of thulium (Tm) from $^3F_4$ to $^3H_4$ (1.47 $\mu$m band), and a stimulated transition of praseodymium (Pr) from $^1G_4$ to $^3H_5$ (1.3 $\mu$m band), which are suitable in optical data transmission systems because those stimulated transitions have wavelengths that belong to a wavelength band with a low transmission loss through an optical fiber. Other examples are a stimulated transition of erbium (Er) from $^4I_{11/2}$ to $^4I_{13/2}$ (2.7 $\mu$m band), and a stimulated transition of holmium (Ho) from $^5I_6$ to $^5I_7$ (2.9 $\mu$m band), which may be used in medical field as a laser surgical knife because of extremely high capability of absorbing the OH. group in organic compounds constituting a human body. A gain spectrum or oscillatory spectrum inherent with the transitions are substantially the same as a fluorescent spectrum (a spectrum of emission cross section) of emission due to transition from an upper level to a lower level, and it is peculiar to the material.

FIG. 9 illustrates the energy level structure of thulium (Tm) dopant within fluoride-based glass and a conventional exciting technique or level scheme. Fluoride-based glass fiber with a thulium doped core exhibits a fluorescent spectrum, having a range of wavelengths from 1.45 $\mu$m to 1.50 $\mu$m with 1.47 $\mu$m as a central of wavelength, due to a transition from $^3F_4$ to $^3H_4$. The gain medium is pumped by light derived from an exciting light source having a 1.05 $\mu$m wavelength band (ranging from 1.04 to 1.07 $\mu$m) and raised from a ground level to a $^3F_4$ level with a high efficiency through two-stage excitation scheme (involving excited state absorption) as illustrated in FIG. 9, resulting in production of laser amplification and laser oscillation at 1.47 $\mu$m band. This technique is disclosed in JP-B2 2688303.

Wavelength dependency of the gain fiber amplifier gain is substantially identical with the fluorescent spectrum and has a single ridge profile having its peak at 1.47 $\mu$m.

Accordingly, a need remains to provide a laser amplifier and a laser oscillator, which are capable of carrying out amplification over a longer wavelength band than ever in each of the before listed important transitions.

SUMMARY OF THE INVENTION

An object of the present invention is to provide a laser amplifier and a laser oscillator incorporating a transition to an energy level higher than a ground level, which amplifier and oscillator are capable of carrying out amplification over a longer wavelength band than ever by utilizing a gain shift technique.

According to the present invention, there is provided a laser amplifier and/or oscillator comprising:

a gain medium including rare earth dopant in a host medium, ions of said rare earth dopant having an energy level structure including a ground level and a pair of laser upper level and laser lower levels between which a stimulated transition is to be produced after production of a population inversion between said pair of laser upper and laser lower levels, said pair of laser upper and laser lower levels being higher than said ground level;

a first exciting light source coupled to said gain medium for introducing first exciting light to said gain medium to produce said population inversion; and a second exciting light source coupled to said gain medium for introducing second exciting light source to said gain medium to raise ions of said rare earth dopant from said ground level to said laser lower level, said second exciting light having a wavelength band different from a wavelength band of said first exciting light.

DESCRIPTION OF THE PREFERRED EMBODIMENTS

[Preferred Implementation of the Present Invention]

Figure 1:
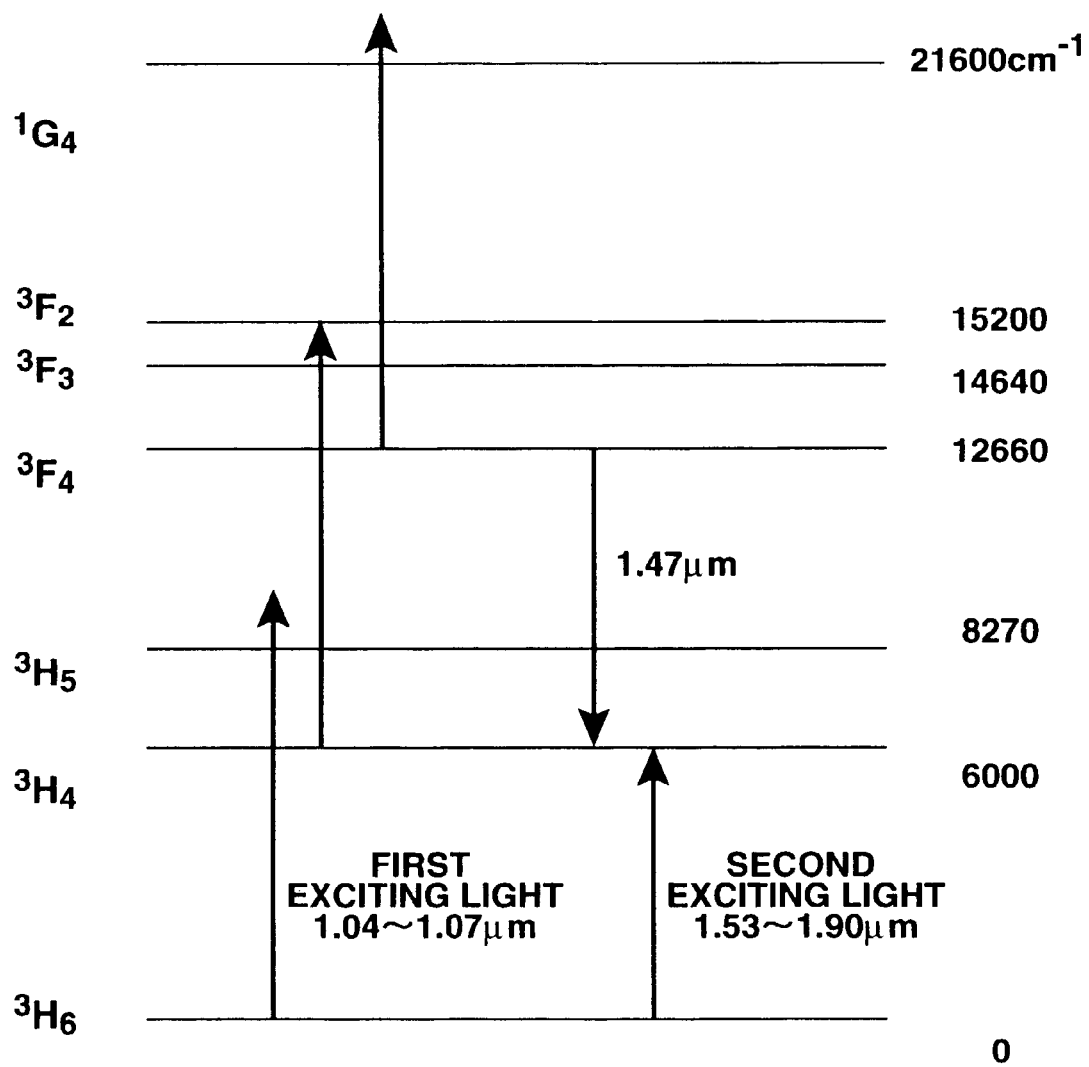
FIG. 1 illustrates an energy level structure of thulium (Tm) and a level scheme according to the present invention.

In the preferred implementation according to the present invention, a first exciting light creates inverse population between two desired energy levels, thereby to accomplish laser amplification upon stimulated transition between the two energy levels. With a second exciting light, the dopant ionic density at the lower energy level is increased, thus causing the effective gain peak to shift toward the longer wavelength side. A description on the action of the second exciting light is made below.

The gain $g(\lambda)$ per unit length of a laser amplifier can be expressed by the following equation:

$$g(\lambda) = \sigma_{em}(\lambda)N_U - \sigma_{abs}(\lambda)N_L \quad (1),$$

where:

$\lambda$ is the wavelength, $\sigma_{em}(\lambda)$ is the stimulated emission cross section (peculiar to material) from an upper energy level to a lower energy level, $\sigma_{abs}(\lambda)$ is the absorption cross section (peculiar to material) from the lower energy level to the higher energy level, $N_U$ is the average dopant ionic density at the upper level along the length, and $N_L$ is the average dopant ionic density at the lower level along the length.

If the lower level dopant ionic density $N_L$ is extremely lower than the upper level dopant ionic density $N_U$, the profile of the gain $g(\lambda)$ is the same as the wavelength dependency of stimulated emission cross section $\sigma_{em}(\lambda)$, and it has a peak wavelength that is peculiar to material. If, due to introduction of a second exciting light, the lower level dopant ionic density $N_L$ is higher than a negligible level, the gain spectrum $g(\lambda)$ fails to be the same as the stimulated emission cross section $\sigma_{em}(\lambda)$ because the term $\sigma_{abs}(\lambda)N_L$ is no longer negligible in the equation (1). With regard to the peak wavelengths of the stimulated emission cross section $\sigma_{em}(\lambda)$ and the absorption cross section $\sigma_{abs}(\lambda)$, the peak wavelength of $\sigma_{em}(\lambda)$ is longer than the peak wavelength of $\sigma_{abs}(\lambda)$ in transition between two energy levels except where both $\sigma_{em}(\lambda)$ and $\sigma_{abs}(\lambda)$ intersect. Accordingly, if the lower level dopant ionic density $N_L$ is not negligible, a reduction in gain due to absorption at shorter wavelength side is great, while a reduction in gain due to absorption at longer wavelength side is small. As a result, the peak of the profile of gain $g(\lambda)$ moves toward the longer wavelength side as the upper level population increases, thus providing the desired gain shift.

Preferred examples of rare earth dopant species, which may be used in the preferred implementation according to the present invention, are erbium (Er), holmium (Ho), thulium (Tm), and praseodymium (Pr). Rare earth dopant species, which may be used in the present invention, is not limited to these examples. Any other rare earth dopant species may be used as long as it has a stimulated transition between upper and lower energy levels that are higher than a ground level.

The rare earth dopant species is added to a host medium of a solid laser or a fiber laser. In most cases, the host medium is glass. If the glass is melted to form a fiber, the length of the fiber can be optimized to obtain a gain as high as the desired level. Thus, the fiber configuration is preferred. Examples of glass are silica glass, phosphate glass, borate glass, germanium glass, telluride glass, fluorozirconiumate glass, and fluorophosphoric acid glass. Among them, fluorozirconiumate glass is preferred because the phonon energy is the lowest and transition between a pair of levels having a small energy difference (that is, transition at long wavelength) is not a non-radiation transition but a radiation transition that produces emission of light.

A first exciting light source must produce first light that has wavelength and strength great enough to produce population inversions between a pair of upper and lower levels that are higher than a ground level. The wavelength and strength are chosen taking into account a difference in energy between the pair of levels. A second exciting light source must produce second light that has wavelength and strength great enough to raise dopant ions from the ground level to the lower level. The wavelength and strength are chosen taking into account a difference in energy between the lower and ground levels.

If, for example, thulium ions ($Tm^{3+}$) are used as dopant species, it is preferred that the first exciting light source produces first light having wavelengths ranging from 1.04 to 1.07 $\mu$m, and the second exciting light source produces second light having wavelengths ranging from 1.53 to 1.90 $\mu$m.

If, for example, erbium ions ($Er^{3+}$) are used as dopant species, it is preferred that the first exciting light source produces first light having wavelengths ranging from 0.81 to 0.98 $\mu$m, and the second exciting light source produces second light having wavelengths ranging from 1.45 to 1.57 $\mu$m.

If, for example, holmium ions ($Ho^{3+}$) are used as dopant species, it is preferred that the first exciting light source produces first light having wavelengths ranging from 0.89 to 1.15 $\mu$m, and the second exciting light source produces second light having wavelengths ranging from 1.8 to 2.1 $\mu$m.

The preferred implementation according to the present invention finds increasing use for many applications, particularly in fiber amplifiers or in laser oscillators. A resonator is required to form a laser oscillator.

If the preferred implementation is to find use in next generation WDM transmission systems for widened wavelength range, a fiber amplifier including first and second exciting light sources is coupled in series with a conventional fiber amplifier that incorporate emission derived from stimulated transition between a pair of energy levels produced after excitation by a single exciting light source.

[Preferred Embodiments]

The present invention is further described along with various embodiments as follows.

[First Embodiment]

Figure 2:
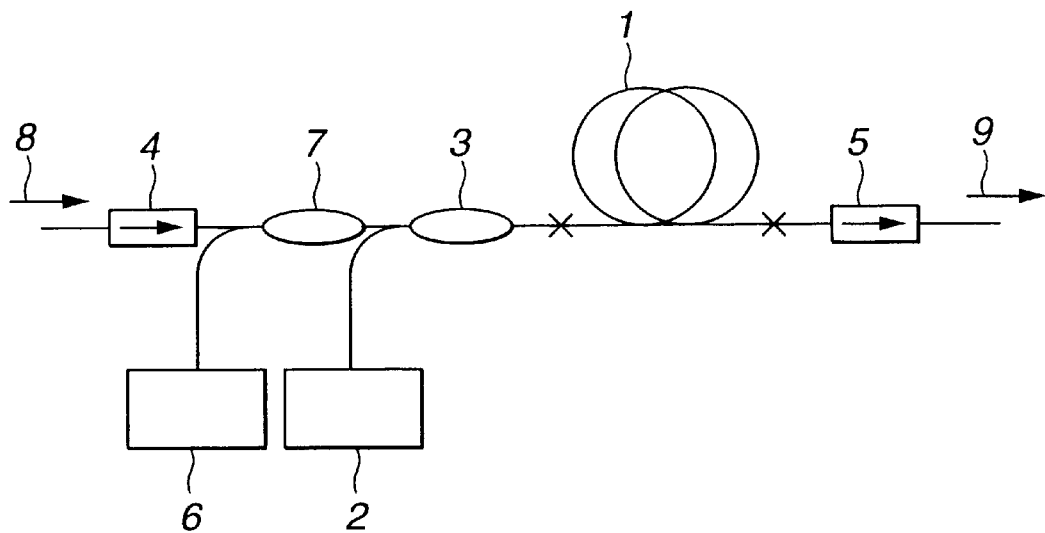
FIG. 2 is a schematic view of a fiber amplifier according to the present invention.

A description is made on the first embodiment according to the present invention. Thulium (Tm) doped fluoride-based glass fiber is used as an amplifier fiber and a transition from $^3F_1$ to $^3H_1$ (1.47 $\mu$m band) has been observed. FIG. 1 clearly illustrates the stimulated transition produced by excitation by the first and second exciting light. FIG. 2 illustrates one example of a fiber amplifier according to the present invention.

Referring to FIG. 2, the fiber amplifier has 20 m of amplifier optical fiber 1, which has thulium (Tm) in fluoroziconiumate host glass and a core with a diameter of 2.0 $\mu$m. The density of thulium (Tm) is 2000 ppm. A first exciting light source 2 incorporates a yttrium (Yb) fiber laser (maximum output:500 mW) that produces laser light in 1.05 $\mu$m wavelength band. To introduce this laser light into the doped fiber 1 to produce a population inversion, a wavelength multiplex coupler 3 couples the first exciting light source 2 to the fiber 1. In a practical implementation, it may be necessary to include isolators 4 and 5 at signal input and output ports, respectively, to reject undesired laser power. A semiconductor laser is used as a signal light source. Signal light 8 derived from the semiconductor laser has a wavelength band from 1.45 to 1.55 $\mu$m and has an input level −20 dBm. For measurement of ASE (Amplified Spontaneous Emission) spectrum, the input level is set to 0 dBm when the signal light is used as a saturation signal. The reference numeral 9 designates an amplified signal.

A second exciting light source 6 includes an erbium doped fiber amplifier (maximum output:100 mW) that produce amplified light or second exciting light in 1.55 $\mu$m wavelength band. A wavelength multiplex coupler 7 couples the second exciting light source 6 to the thulium doped fiber 1. Viewing in FIG. 2, the second exciting light is introduced to the fiber 1 at the input side of the wavelength multiplex coupler 3. The invention is not limited to the illustrated manner of incidence of the second exciting light. The second exciting light has a wavelength that falls in wavelength spectrum of absorption transition from a bottom level of thulium (Tm) to the level of $^3H_4$. This absorption transition spectrum has a peak at approximately 1.65 $\mu$m and extends as far as 1.9 $\mu$m. In this illustrated example, the wavelength of the second exciting light is set at 1.56 $\mu$m that is a wavelength located in foot of the spectrum. Initially, tests were conducted by varying the wavelength of the second exciting light within a range from 1.53 to 1.57 $\mu$m without any great difference in results.

Figure 3:
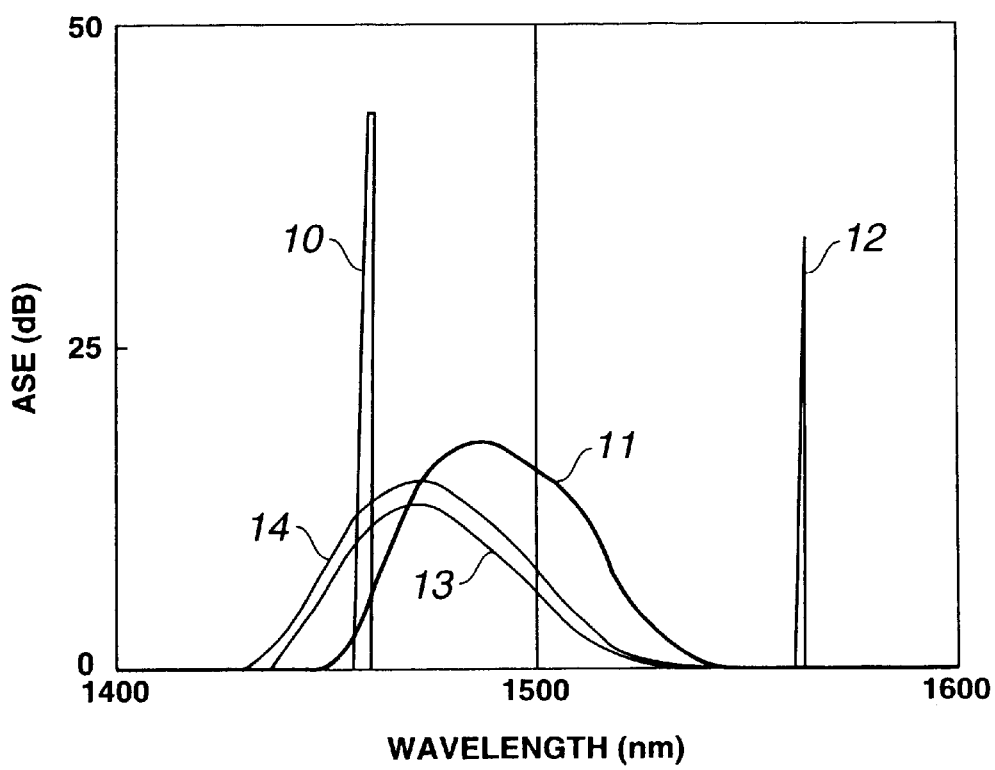
FIG. 3 is a graphical representation of ASE spectra of a thulium-doped fiber amplifier according to the present invention and the conventional comparative example of a thulium-doped fiber amplifier.
Figure 10:
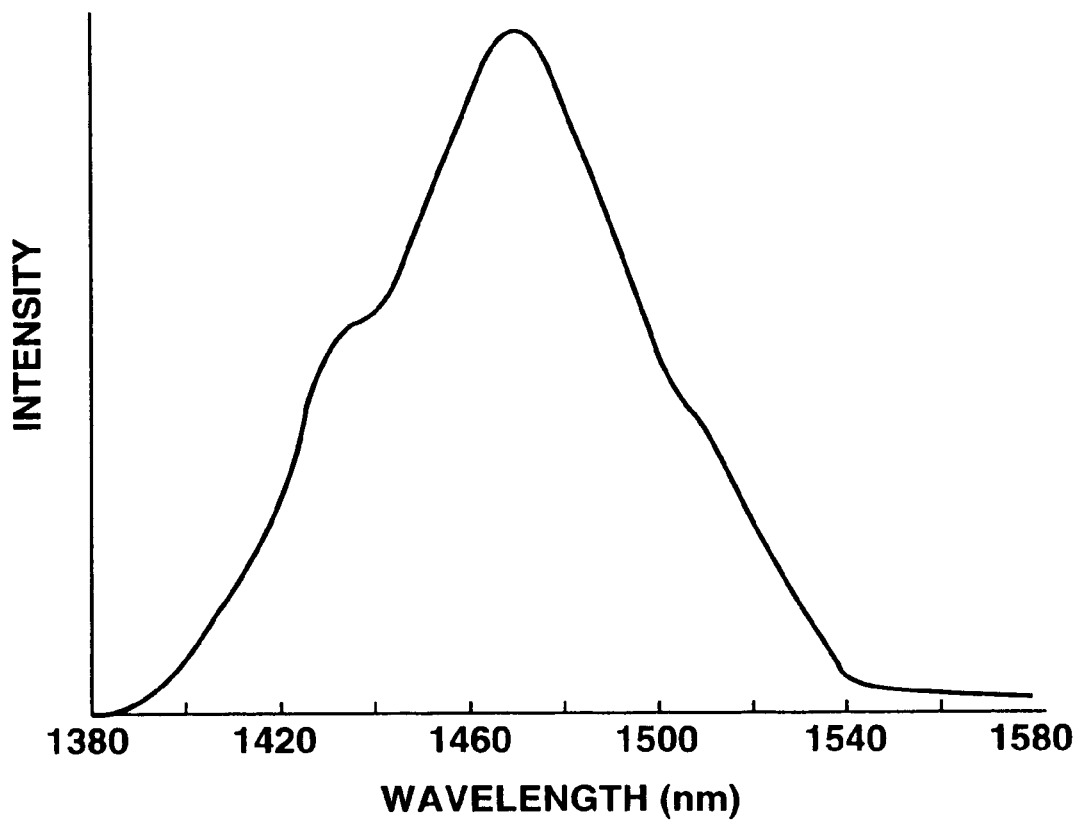
FIG. 10 is a graphical representation of a fluorescent spectrum produced by the conventional level scheme of thulium.

FIG. 3 illustrates spectra of ASE in the illustrated system. The reference numeral 10 indicates a spectrum of a 1.46 $\mu$m band saturation signal (input level:0 dBm), which is used to fix a population inversion of the fiber amplifier. The reference numeral 12 designates a spectrum of the second exciting light (wavelength:1.56 $\mu$m). The reference numerals 13 and 14 designate spectra of the first exciting lights with different power outputs of 140 mW and 200 mW, respectively. These spectra has a single ridge profile having its peak at 1.47 $\mu$m wavelength band. This profile is substantially the same as the profile of the translucent spectrum of thulium (Tm) illustrated in FIG. 10. The single ridge profile remains unaltered even if the power output is varied from 140 mW to 200 mW. ASE output becomes great due to this variation.

In addition to the first exciting light with 14, the second exciting light with 100 mW has been introduced into the thulium-doped fiber 1. When the total exciting power of the first and second exciting lights is 240 mW, a shift in the profile has occurred. As shown by a spectrum 11 in FIG. 3, the resultant profile has a portion suppressed on the short wavelength side and has a peak that has been shifted toward the longer wavelength side from the peak at 1.47 $\mu$m. The amount of the shift of the peak ranges from 10 to 15 nm.

Figure 4:
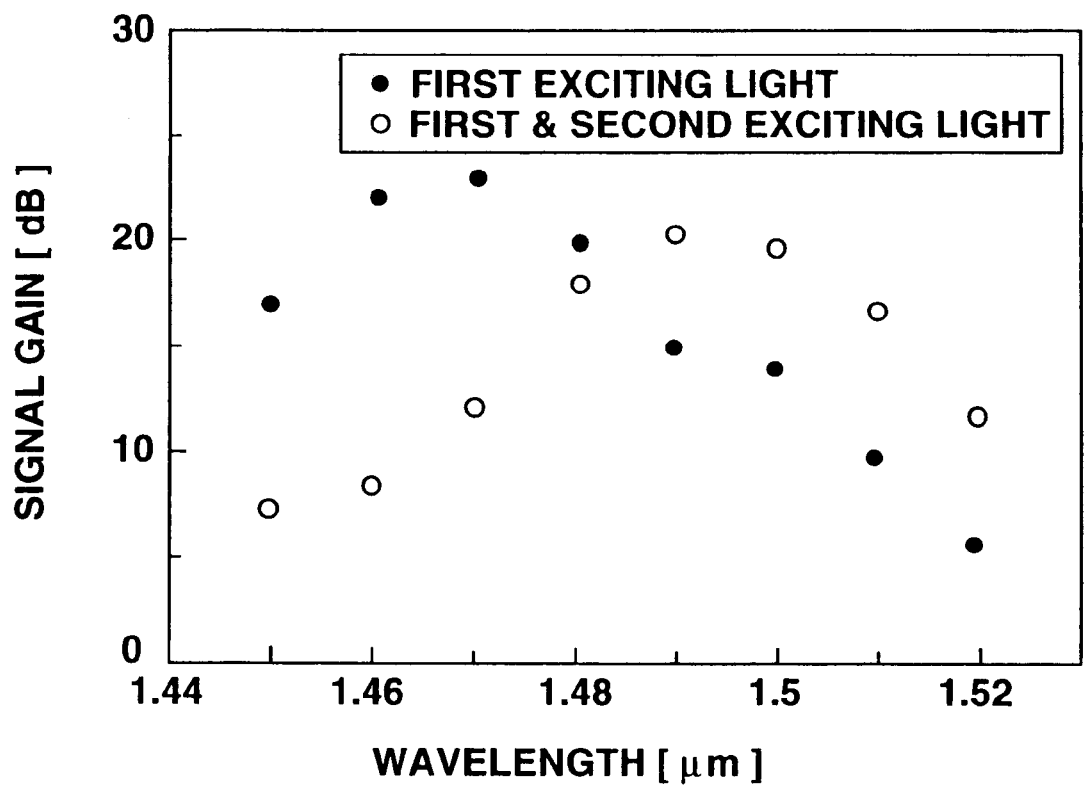
FIG. 4 is a graphical representation of amplified gains produced by the first embodiment and the conventional comparative example.

FIG. 4 illustrates a gain spectrum obtained with the first exciting light only and a gain spectrum obtained with both first and second exciting lights. Introduction of the first exciting light with 200 mW only has produced the gain spectrum having a peak at 1.49 $\mu$m as shown in FIG. 4. Introduction of second exciting light with 60 mW in addition to first exciting light with 140 mW has produced a gain spectrum having a peak at 1.49 $\mu$m. Thus, a gain shift from 1.47 $\mu$m to 1.49 $\mu$m has taken place. A reduction in effective gain may be compensated for by elongation of the fiber length.

[Second Embodiment]

Figure 5:
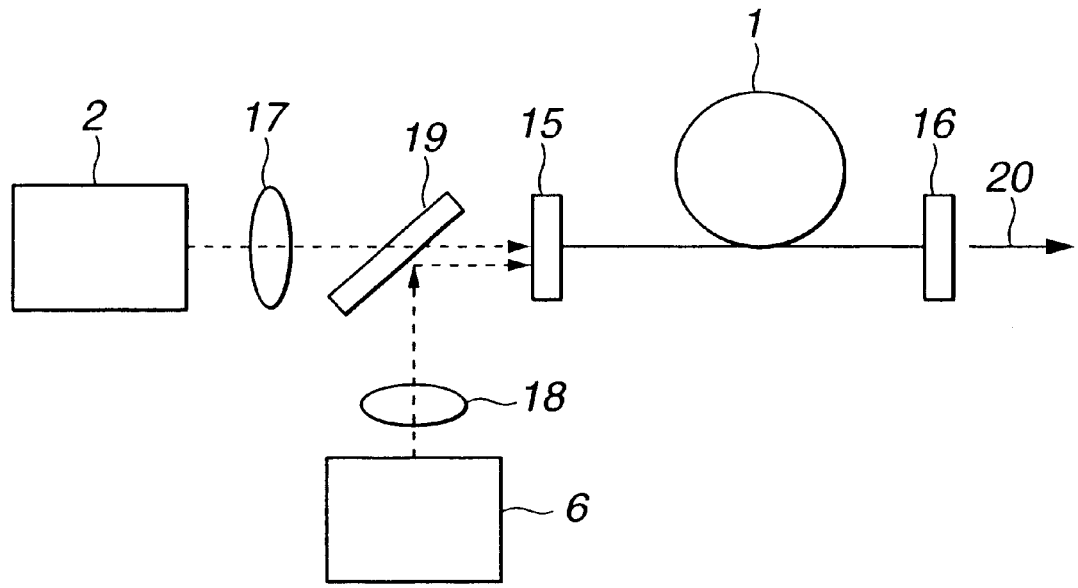
FIG. 5 is a schematic view of a fiber laser oscillator according to the present invention.

FIG. 5 is a schematic illustrating the construction of the second embodiment of a thulium-doped fiber laser according to the present invention. First and second exciting light sources 2 and 6 are the same as their counterpart in the first preferred embodiment. At one end of a thulium-doped optical fiber 1, a rear mirror 15 is provided. The rear mirror 15 has no reflection against the wavelengths of the first and second exciting lights and total internal reflection against an oscillation wavelength band. At the other end of the optical fiber 1, an output mirror 16 is provided. The output mirror 16 has a partial reflection against the oscillation wavelength band. The first and second exciting lights from the sources 2 and 6 are emitted to a free space. After being emitted into the free space, the first and second exciting lights pass through a lens 17, a lens 18, a dichroic mirror 19 and the rear mirror 15, and enters the thulium-doped fiber 1. The lenses 17, 18 and the mirrors 19, 15 are constructed and arranged as to guide the first and second exciting lights to be introduced into the fiber 1 from the one end thereof. Through the output mirror 16, the fiber 1 outputs fiber laser oscillation light 20.

Figure 6:
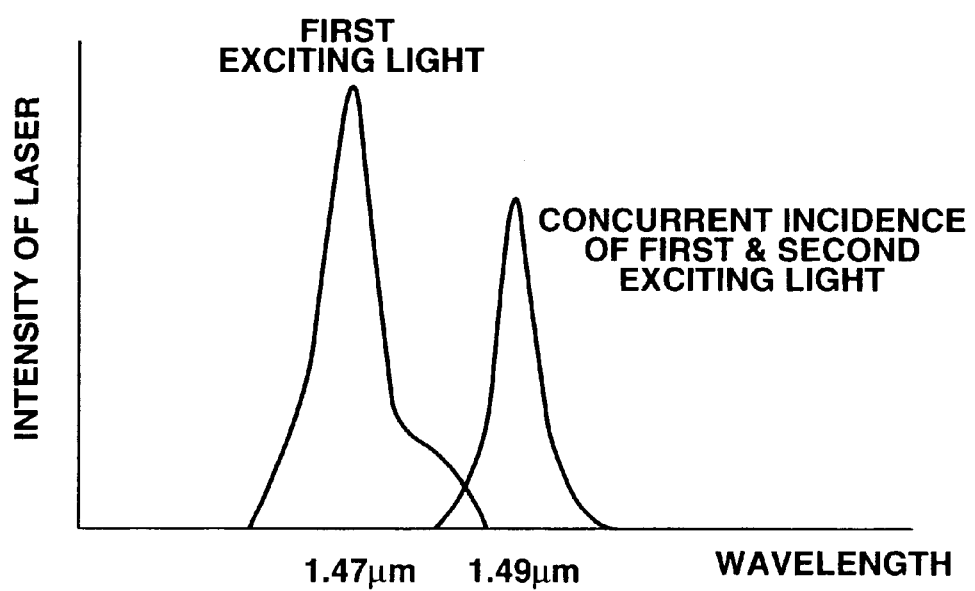
FIG. 6 is a graphical representation of oscillation spectra of a thulium-doped fiber laser oscillator according to the present invention and the conventional comparative example of a thulium-doped fiber laser oscillator.

FIG. 6 illustrates a laser oscillation spectrum produced by the second embodiment in comparison with a laser oscillation spectrum produced by a thulium fiber laser excited by the first exciting light only. Oscillation of laser at longer wavelength side of 1.49 $\mu$m has occurred irrespective of the fact that no wavelength selection element, such as, a grating and a prism, are inserted into the laser resonator. With the thulium-doped fiber laser excited by the first exciting light only, a laser oscillation is found at the wavelength of 1.47 $\mu$m, which corresponds to the peak of the fluorescent spectrum.

[Third Embodiment]

Figure 7:
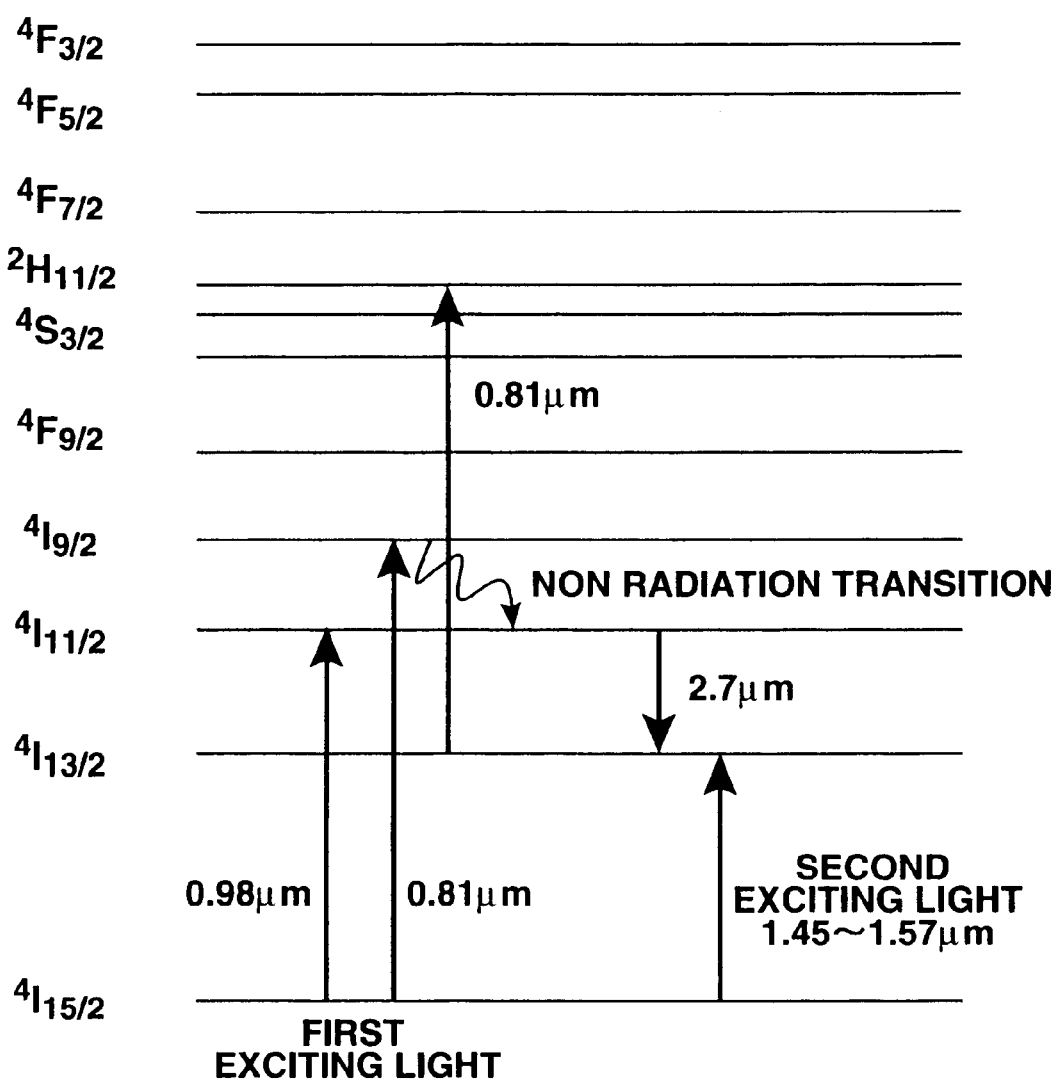
FIG. 7 illustrates an energy level structure of erbium (Er) and a level scheme according to the present invention.

As the third embodiment according to the present invention, a stimulated transition of erbium (Er) from $^4I_{11/2}$ to $^4I_{13/2}$ (2.7 $\mu$m band) has been observed. FIG. 7 illustrates the energy level structure of erbium (Er). With the first exciting light having 0.81 μm in wavelength or that having 0.98 μm in wavelength, it is possible to produce a population inversion between $^4I_{11/2}$ and $^4I_{13/2}$, and to produce a gain in 2.7 μm wavelength band by a stimulated transition. Using the second exciting light having a wavelength falling between 1.45 μm and 1.55 μm, the erbium dopant ions are excited and raised from a ground level to the lower level $^4I_{13/2}$. A shift in gain spectrum toward the longer wavelength side is made.

In this third embodiment, the second exciting light source includes an erbium fiber laser that produces a laser oscillation at 1.55 μm in wavelength. Referring back to FIG. 5, the erbium-doped fiber laser has 100 cm of optical fiber 1, which has erbium (Er) in fluorozirconiumate host glass. The density of erbium (Er) is 1000 ppm. With the introduction of the first exciting light only, a laser oscillation in the neighborhood of 2.7 μm in wavelength is found. With the introduction of both the first and second exciting lights, a laser oscillation at 2.8 μm in wavelength is found. Thus, a shift in oscillation wavelength toward the longer wavelength side is made.

{Fourth Embodiment}

Figure 8:
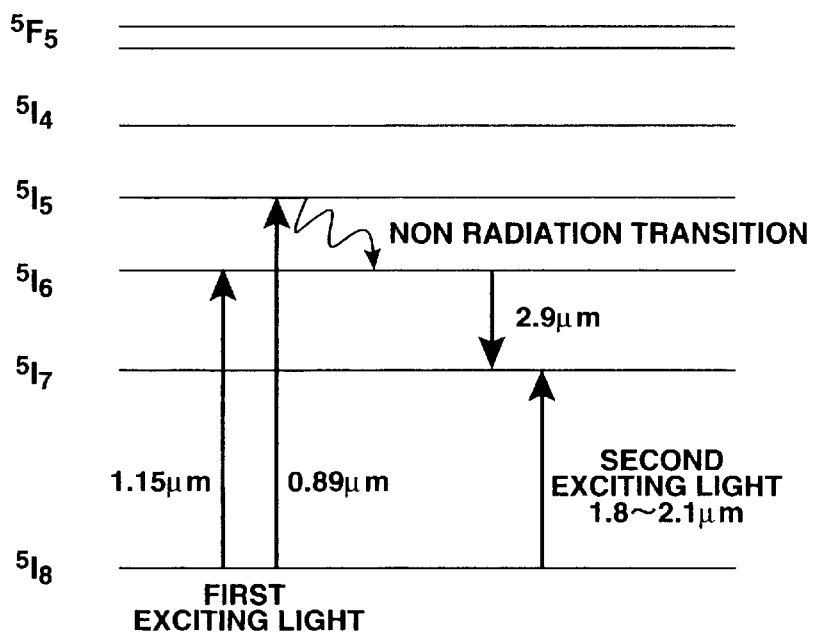
FIG. 8 illustrates an energy level structure of holmium (Ho) and a level scheme according to the present invention.
Figure 9:
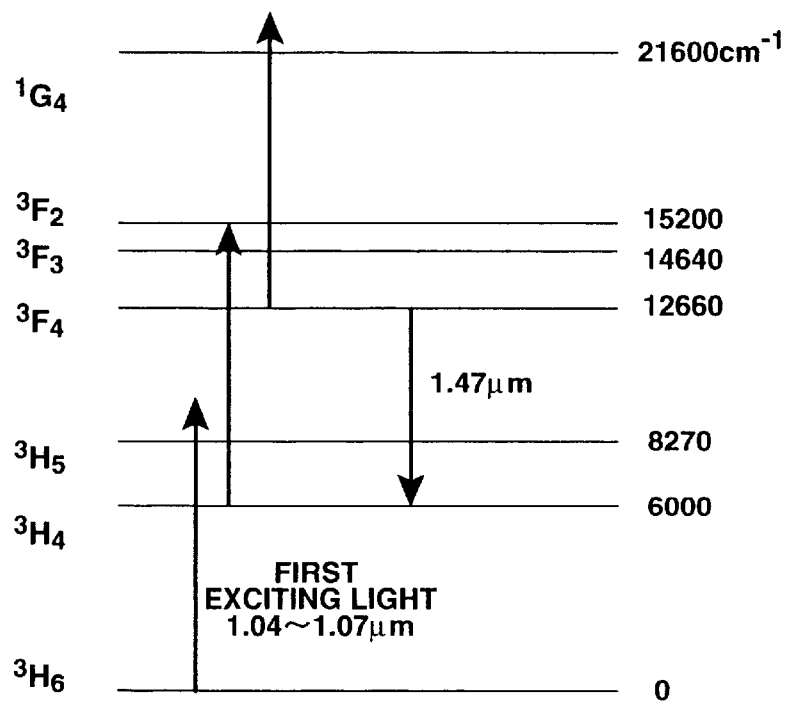
FIG. 9 illustrates an energy level structure of thulium (Tm) and a level scheme according to the conventional art.

As the fourth embodiment according to the present invention, a stimulated transition of holmium (Ho) from $^5I_6$ to $^5I_7$ has been observed. FIG. 8 illustrates the energy level structure of holmium (Ho). With the first exciting light having 0.89 μm in wavelength band from a semiconductor laser or that having 0.98 μm in wavelength band from a fiber laser, it is possible to produce a population inversion between $^5I_6$ and $^5I_7$, and to realize a gain spectrum having a peak at 2.85 μm in wavelength. Referring again to FIG. 5, a holmium-doped fiber laser has 2 m of optical fiber 1, which has holmium (Ho) in host fluoride-based glass. The density of holmium (Ho) is 5000 ppm. As the second exciting light source, a conventional semiconductor laser is used, which is capable of producing a wavelength range from 1.8 μm and 2.1 μm. With introduction of both the first and second exciting lights, a shift in oscillation wavelength toward the longer wavelength side is made. The shift has amounted to about 10 nm.

[Fifth Embodiment]

The fifth embodiment according to the present invention may be regarded as an improvement version of the first embodiment. A detailed study is made on gain spectrum that has been produced by exciting a gain medium of thulium-doped optical fiber (density of thulium:2000 ppm, the fiber length:20 m) of a fiber amplifier in a system as illustrated in FIG. 2.

Figure 11:
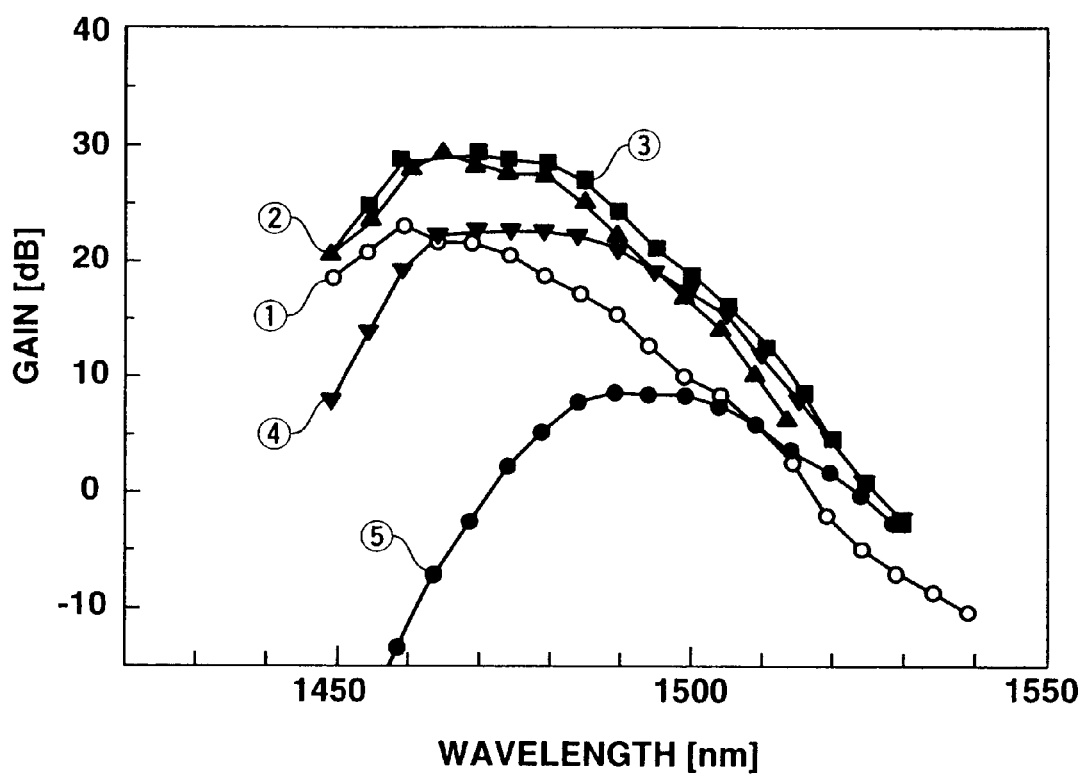
FIG. 11 is a graphical representation of gain spectra used to explain a fifth embodiment of a fiber amplifier according to the present invention.

Input signal power is −30 dBm, input signal wavelength ranges from 1450 to 1540 nm, and power of the first exciting light (1050 nm) is 100 mW. Similarly to the first embodiment, an ytterbium (Yb) doped fiber laser is used as the first exciting light source 2. Amplified output from a 1.55 μm band erbium-doped fiber amplifier is used as the second exciting light source 6. A study is made on gain spectra produced after varying by stages power of the second exciting light (1560 nm) from 0 mW to 35.3 mW. The gain spectra are illustrated in FIG. 11. In FIG. 11, the curves ① to ⑤ are gain spectra obtained with power levels of the second exciting light of 0 mW, 8 mW, 12 mW, 20 mW, and 35.3 mW.

FIG. 11 clearly reveals that, when the power level of the second exciting light is about 10% of the power level of the first exciting light (see spectra ② and ③), an increase in gain exceeding 7 dB is observed in wavelength band range from 1460 nm to 1480 nm. Thus, a gain efficiency is enhanced from 0.2 dB/mW to 0.26 dB/mW. When the power level of the second exciting light (20 mW) is about 20% of the power level of the first exciting light (see spectrum ④), the flattening of the gain band as we as its shift toward the longer wavelength side are observed. When the power level of the second exciting light (35.3 mW) is 30% of the power level of the first exciting light (see spectrum ⑤), the peak of the gain drops to about 10 dB with widened gain band range from 1480 nm to 1510 nm as well as noticeable amount of gain shift.

From the above, it is appreciated that the present invention proved to be effective in not only a gain shift, but also improvement on gain efficiency (dB/mW) and flattening of gain.

[Sixth Embodiment]

Figure 12:
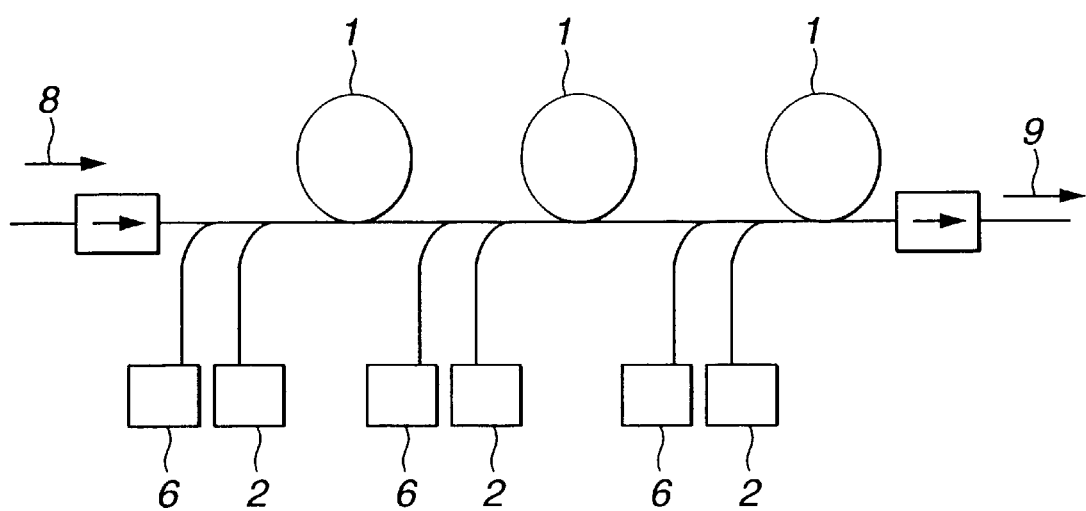
FIG. 12 is a schematic view of a sixth embodiment of a fiber amplifier according to the present invention.

In the sixth embodiment, a greater gain shift and a higher gain are accomplished by increasing the fiber length taking into account the results obtained in the fifth embodiment. Referring to FIG. 12, three thulium-doped fiber modules, each having a 20 m thulium-doped fiber 1, are coupled in series. Per each thulium-doped fiber 1, first exciting light and second exciting light are introduced with power levels 300 mW and 30 mW, respectively, in the same manner as the first embodiment. Optical elements are not illustrated in FIG. 12.

Figure 13:
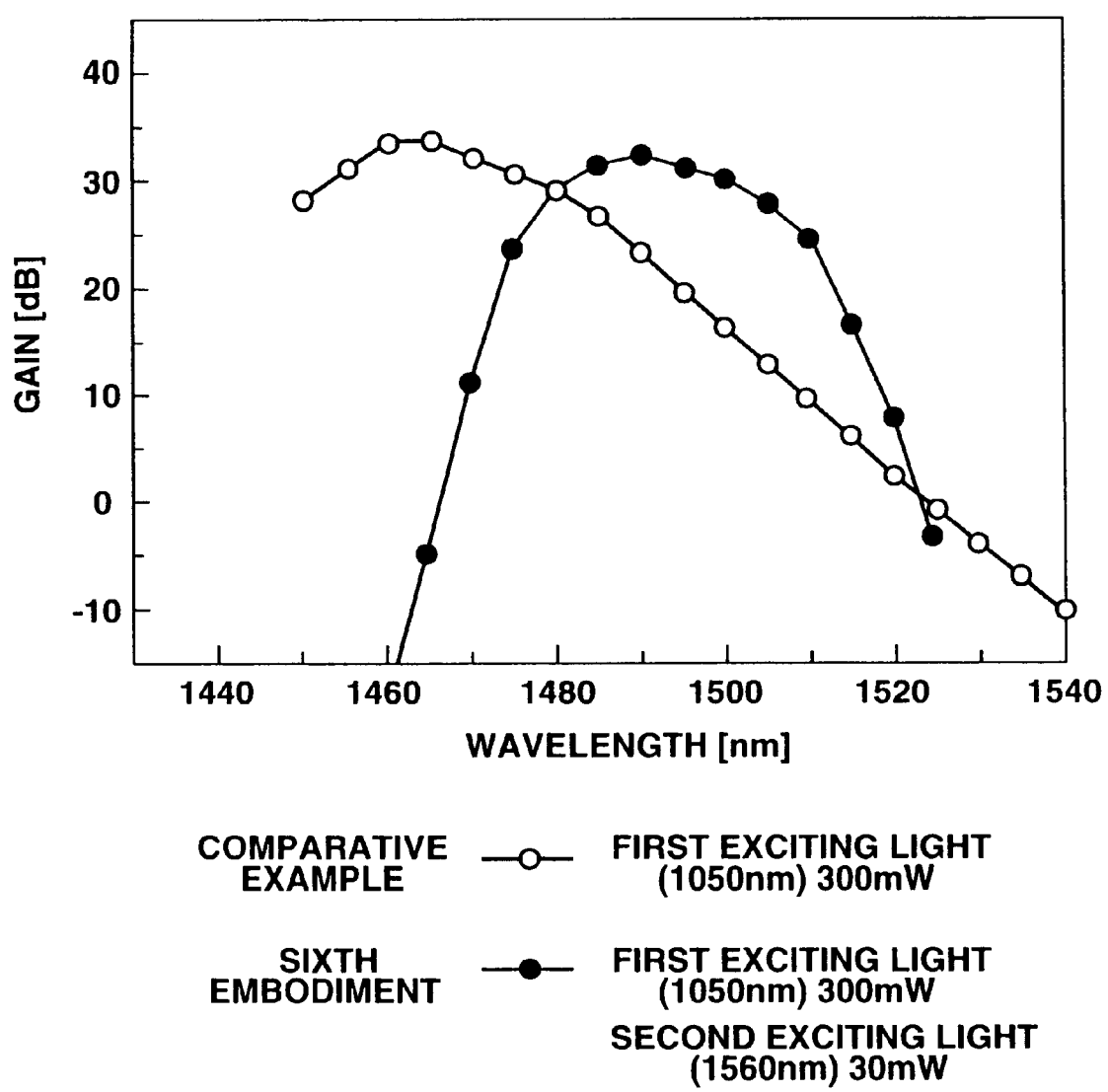
FIG. 13 is a graphical representation of gain spectra used to explain the sixth embodiment.

FIG. 13 shows a gain spectrum obtained by the sixth embodiment in comparison with a gain spectrum obtained by the comparative example. In FIG. 13, the gain spectrum ② is obtained by the sixth embodiment. A high gain of 30 dB is obtained in the wavelength range from 1480 nm to 1510 nm.. the gain spectrum ① is obtained by the comparative example. Comparison reveals considerable improvements in gain shift and gain efficiency.

In the description on the various embodiments, the invention has been described along with specific examples of the rare earth dopant species, the first exciting light source, and the second exciting light source. However, the invention is not limited to these illustrated examples.

Other examples of the second exciting light source are semiconductor laser, erbium-doped fiber laser, solid lasers of various kinds, and an appropriate combination of them. For example, a light source combining a semiconductor laser with a fiber amplifier may be used. Specifically, a 1.55 μm band DFB laser in combination with an erbium-doped fiber amplifier may be used.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claim is:

1. A laser amplifier comprising:
    a gain medium including a rare earth dopant in a host medium, ions of said rare earth dopant having an energy level structure including a ground level, a laser upper level and a laser lower level, wherein a stimulated transition is to be produced after production of a population inversion between said laser upper level and said laser lower level, said laser upper level and said laser lower level being higher than said ground level;
    a first exciting light source coupled to said gain medium for introducing a first exciting light to said gain medium to produce said population inversion; and
    a second exciting light source coupled to said gain medium for introducing a second exciting light to said gain medium to raise said ions of said rare earth dopant from said ground level to said laser lower level so as to reduce the density of said population inversion, said second exciting light having a wavelength band different from a wavelength band of said first exciting light.

2. The laser amplifier as claimed in claim 1, wherein said rare earth dopant is selected from a group consisting of thulium (Tm), holmium (Ho), erbium (Er) and praseodymium (Pr).

3. The laser amplifier as claimed in claim 1, wherein said host medium is fluorozirconiumate glass.

4. The laser amplifier as claimed in claim 1, wherein the ions of said rare earth dopant are thulium ions ($Tm^{3+}$), and wherein said first exciting light source produces light having a wavelength band ranging from 1.04 $\mu$m to 1.07 $\mu$m, and said second exciting light source produces light having a wavelength band ranging from 1.53 $\mu$m to 1.90 $\mu$m.

5. The laser amplifier as claimed in claim 1, wherein the ions of said rare earth dopant are erbium ions ($Er^{3+}$), and wherein said first exciting light source produces light having a wavelength selected from a wavelength of 0.81 $\mu$m and a wavelength of 0.98 $\mu$m, and said second exciting light source produces light having a wavelength band ranging from 1.45 $\mu$m to 1.57 $\mu$m.

6. The laser amplifier as claimed in claim 1, wherein the ions of said rare earth dopant are holmium ions ($Ho^{3+}$), and wherein said first exciting light source produces light having a wavelength selected from a wavelength of 0.89 $\mu$m and a wavelength of 1.15 $\mu$m, and said second exciting light source produces light having a wavelength band ranging from 1.8 $\mu$m to 2.1 $\mu$m.

7. The laser amplifier as claimed in claim 1, wherein said host medium is an optical fiber in configuration.

8. A laser oscillator comprising:

a gain medium including a rare earth dopant in a host medium, ions of said rare earth dopant having an energy level structure including a ground level, a laser upper level and a laser lower level, wherein a stimulated transition is to be produced after production of a population inversion between said laser upper level and said laser lower level, said laser upper level and laser lower level being higher than said ground level;

a first exciting light source coupled to said gain medium for introducing a first exciting light to said gain medium to produce said population inversion; and a second exciting light source coupled to said gain medium for introducing a second exciting light to said gain medium to raise said ions of said rare earth dopant from said ground level to said laser lower level so as to reduce the density of said population inversion, said second exciting light having a wavelength band different from a wavelength band of said first exciting light.

9. The laser oscillator as claimed in claim 8, wherein said rare earth dopant is selected from a group consisting of thulium (Tm), holmium (Ho), erbium (Er) and praseodymium (Pr).

10. The laser oscillator as claimed in claim 8, wherein said host medium is fluorozirconiumate glass.

11. The laser oscillator as claimed in claim 8, wherein the ions of said rare earth dopant are thulium ions ($Tm^{3+}$), and wherein said first exciting light source produces light having a wavelength band ranging from 1.04 $\mu$m to 1.07 $\mu$m, and said second exciting light source produces light having a wavelength band ranging from 1.53 $\mu$m to 1.90 $\mu$m.

12. The laser oscillator as claimed in claim 8, wherein the ions of said rare earth dopant are erblum ions ($Er^{3+}$), and wherein said first exciting light source produces light having a wavelength selected from a wavelength of 0.81 $\mu$m and a wavelength of 0.98 $\mu$m, and said second exciting light source produces light having a wavelength band ranging from 1.45 $\mu$m to 1.57 $\mu$m.

13. The laser oscillator as claimed in claim 8, wherein the ions of said rare earth dopant are holmium ions ($Ho^{3+}$), and wherein said first exciting light source produces light having a wavelength selected from a wavelength of 0.89 $\mu$m and a wavelength of 1.15 $\mu$m, and said second exciting light source produces light having a wavelength band ranging from 1.8 $\mu$m to 2.1 $\mu$m.

14. The laser oscillator as claimed in claim 8, wherein said host medium is an optical fiber in configuration.

15. An apparatus for widening a wavelength band of a gain comprising:

a first laser amplifier; and a second laser amplifier coupled to said first laser amplifier in series, wherein said first laser amplifier has:

a gain medium including a rare earth dopant in a host medium, ions of said rare earth dopant having an energy level structure including a ground level, a laser upper level and a laser lower level, wherein a stimulated transition is to be produced after production of a population inversion between said laser upper level and said laser lower level, said laser upper level and said laser lower level being higher than said ground level;

a first exciting light source coupled to said gain medium for introducing a first exciting light to said gain medium to produce said population inversion; and a second exciting light source coupled to said gain medium for introducing a second exciting light to said gain medium to raise said ions of said rare earth dopant from said ground level to said laser lower level so as to reduce the density of said population inversion, said second exciting light having a wavelength band different from a wavelength band of said first exciting light, and wherein said second laser amplifier has a stimulated transition produced after production of a population inversion between a pair of energy levels.

16. A process of widening a wavelength band of a gain utilizing an apparatus as claimed in claim 15.

* * * * *